(12) United States Patent
Archambault

(10) Patent No.: US 6,476,945 B1
(45) Date of Patent: Nov. 5, 2002

(54) WAVELENGTH ALLOCATION IN A RING

(75) Inventor: Sylvain S. Archambault, Hull (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/323,018

(22) Filed: Jun. 1, 1999

(51) Int. Cl.$^7$ .......................... H04B 10/20; H04J 14/02
(52) U.S. Cl. ....................................... 359/119; 359/127
(58) Field of Search ................................ 359/119, 124, 359/125, 127, 133

(56) References Cited

U.S. PATENT DOCUMENTS

| | | | | |
|---|---|---|---|---|
| 5,751,454 A | * | 5/1998 | MacDonald et al. | 359/119 |
| 5,774,244 A | * | 6/1998 | Tandon et al. | 359/125 |
| 5,999,288 A | * | 12/1999 | Ellinas et al. | 359/119 |
| 6,339,488 B1 | * | 1/2002 | Beshai et al. | 359/119 |

FOREIGN PATENT DOCUMENTS

| | | |
|---|---|---|
| EP | 0 716 521 | 6/1996 |
| WO | WO 99 39470 | 8/1999 |

OTHER PUBLICATIONS

Elrefaie A: "Multiwavelength survivable ring network architectures" Proceedings of the International Conference on Communications (ICC), Geneva, May 23–26, 1993.

Obara, H: "Multifiber wavelength–division multiplexed ring network architecture for Tera–bit/s throughput" Communications, 1998. ICC98. Conference Record. 1998 IEEE International Conference on Atlanta, GA USA Jun. 7–11, 1998.

* cited by examiner

Primary Examiner—Leslie Pascal
Assistant Examiner—Dalzid Singh

(57) ABSTRACT

A method of wavelength allocation that allows creating a fully meshed network at the optical layer when the nodes are connected at the physical layer in a ring. The method uses a minimum number of wavelengths and a same wavelength set on each fiber, with the constraint that a wavelength is used at most once on any resource. A hop table is prepared with all nodes and all wavelengths and the origin of the table is defined by a first node and a first wavelength. For rings with more than seven nodes, an initial hop vector is defined, which is different for rings with an odd and an even number of nodes. All hops for all nodes and all wavelengths are then generated using the initial hop vector, and recorded in the hop table. After the hop table is completed, the nodes are equipped with wavelength-specific receivers and transmitters according to a source-destination table prepared from the hop table. Hop tables are also provided for rings with less than seven nodes.

13 Claims, 5 Drawing Sheets

WAVELENGTH ALLOCATION IN A RING

BACKGROUND OF THE INVENTION

1. Field of the Invention

This invention is directed to wavelength division multiplexed (WDM) networks, and more particularly to a method of allocating the wavelengths in a dual ring.

2. Background Art

Current optical networks generally have a linear or a ring configuration. The ring configuration is considered a cost-effective network architecture allowing bandwidth sharing and improved survivability in the event of span failure. Generally, a ring is formed with add/drop multiplexers (ADMS) which insert/extract traffic into/from a working and a protection fiber/time-slot. But self-healing rings have a fundamental limitation. Namely, if one span only needs a bandwidth upgrade, all nodes have to be replaced to support higher rates. A solution to increase the capacity of the ring is to use a plurality of channels on the same fiber, the channels being routed separately according to their wavelength, a technique termed wavelength division multiplexing (WDM).

A key feature of WDM and dense WDM systems is that the discrete wavelengths form an orthogonal set of carriers which can be separated, routed, and switched without interfering with each other, as long as the total light intensity is kept sufficiently low. By using WDM, the capacity of a ring can be increased in an efficient and cost effective way with minimal changes to the nodes hardware or to the automatic switching protocol (ASP).

A WDM ring network comprises a plurality of add/drop nodes connected in a ring along two unidirectional fibers, one for each direction around the ring. Each add/drop node communicates with an associated edge node(s) using a number of local wavelengths (channels). An edge node is also referred to herein as a user node, or a local user. Edge nodes can be electronic or optical nodes, this is not relevant to the present invention.

A WDM node also comprises transmitters and receivers for each wavelength, and a wavelength add/drop multiplexer (ADM). The ADM multiplexes the local wavelengths received from the associated electronic edge node with the pass through wavelengths, before launching the multiplexed signal over the ring in the direction of interest. The ADM also demultiplexes the traffic received from the ring and directs it to the associated edge node and to the downstream nodes, respectively. Thus, a wavelength may be filtered at a node to drop traffic from the ring to the local user, and new traffic may be added on this wavelength from a local user into the ring. Alternatively, a wavelength can pass through an intermediate node so that it will be terminated at a later node of the ring.

A unidirectional channel is created from a source node to a destination node by injecting a wavelength at the source node and dropping it the destination node. This wavelength cannot be added or dropped at any other nodes between the source and destination nodes, in this unidirectional fiber. A node which is not the source or destination for a certain wavelength is called herein an intermediate node.

Multi-wavelength dual rings can be used to create a high capacity all-optical core network interconnecting several edge nodes. One example of a meshed architecture is a set of parallel dual optical rings interconnecting a number of edge nodes, with each edge node accessing any of the rings. Within a ring, wavelengths are used to create channels between optical node pairs, as described above. The capacity of the ring may be increased by scaling up the number of nodes per ring. This architecture could be attractive for metropolitan networks, since the cost of fibers from the electronic edge nodes, which is proportional to distance, would be small.

Any ring configurations for mesh interconnectivity will benefit, in terms of cost savings, from using the minimum number of wavelengths around the ring, while connecting all nodes. Even though it is not a trivial task, solutions can be derived manually for small numbers of nodes.

For example, U.S. Pat. No. 5,751,454 (MacDonald et al., issued on May 12, 1998, and assigned to Northern Telecom Limited) discloses a wavelength allocation method for full-mesh networks with a small number of nodes. The method provides direct node to node routes, and complete transparent interconnections with extra capacity for heavy used routes on a portion of the ring. For networks with large number of nodes, this patent proposes under-connected networks with a number of accelerated, direct routes between some of the nodes.

It is evident that full connectivity and wavelength allocation become extremely difficult problems to solve for rings with high number of nodes. A method that gives the minimum number of wavelengths and the way that these wavelengths may be allocated between all pairs of nodes of a WDM ring network, and that applies to any number of nodes, is therefore highly desirable.

SUMMARY OF THE INVENTION

It is an object of the present invention to provide a method of wavelength allocation that allows creating a fully meshed network at the optical layer when the nodes are connected, at the physical layer, in a ring.

In one aspect of the invention there is provided in a D/WDM ring with n add/drop nodes connected over a forward and a reverse fiber, a method of allocating a wavelength between each pair of nodes for obtaining a fully meshed network, comprising, determining an add/drop requirement $N_a$ for all nodes of the ring, a fiber requirement $N_f$ for each span of the ring and the minimum number N of wavelengths/span, preparing a hop table with all nodes nj and all wavelengths $\lambda_i$ for the ring and selecting an origin for the hop table by defining a node of origin and a first wavelength, if $N_a \leq N_f$, determining an initial hop vector comprising a set of n initial forward hop values, generating all hops for all nodes and all wavelengths using the initial hop values and recording all the hop values in the hop table, and equipping each node with wavelength-specific receivers and transmitters according to a source-destination table prepared from the hop table. The wavelengths requirement is $N_f$.

Advantageously, the method of the invention uses a minimum number of wavelengths and a same wavelength set on each fiber, with the constraint that a wavelength is used at most once on any resource (add/drop node, fiber).

This method can be readily incorporated in an engineering tool, which significantly simplifies design of the network configuration.

The benefits of this method are thus a reduction of the cost of optical equipment, and a simplification of the network configuration.

BRIEF DESCRIPTION OF THE DRAWINGS

The foregoing and other objects, features and advantages of the invention will be apparent from the following more particular description of the preferred embodiments, as illustrated in the appended drawings, where.

DESCRIPTION OF THE PREFERRED EMBODIMENT

Networks using wavelength routing fall into two general types: single hop, which provide routes directly between nodes; and multi-hop, in which the units of information are accessed by relaying nodes. Routes in single hop networks are equivalent to independent optical fiber paths, each route using a wavelength. In multi-hop networks, a signal on a route may be relayed through several nodes, a number of wavelengths being used in the process. Relaying nodes may perform a store and forward function implying opto-electronic conversion, or simply act as transparent cross-connects. This specification is concerned with single hop networks, and the term "hop" is used to define the number of fiber spans passed through by a respective wavelength channel.

Figure 1:
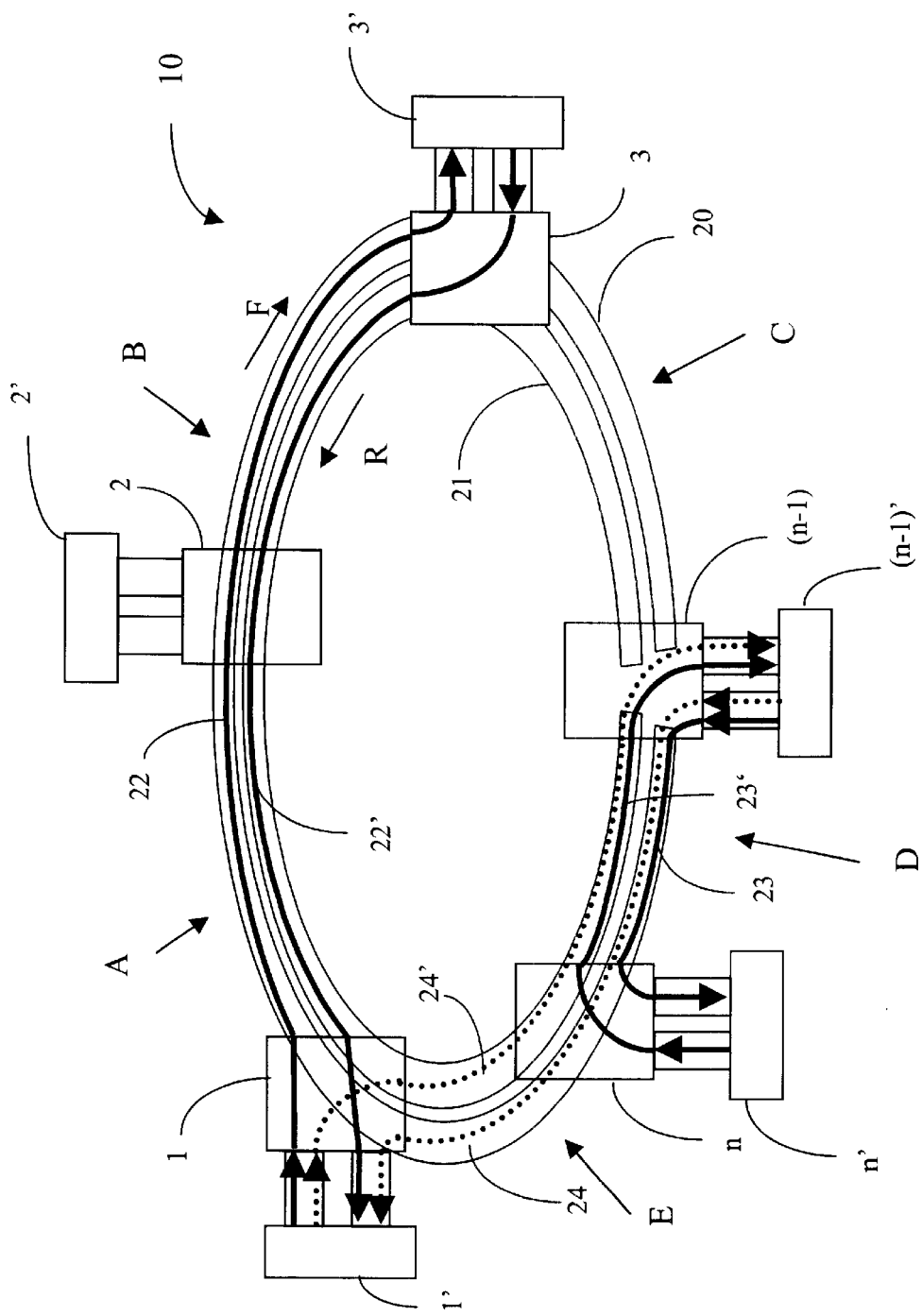
FIG. 1 illustrates a ring network used for describing the wavelength allocation method.

FIG. 1 illustrates a dual ring 10 comprising ADM nodes 1, 2, 3, ... (n-1) and n. It is to be understood that in this specification the nodes are numbered consecutively, so that, for example, second node 2 is adjacent with first node 1 and third node 3. The ADM nodes are connected at the physical level over two counter propagating fibers 20 and 21. Arrows F (forward) and R (reverse) illustrate the direction of traffic on these fibers. It is to be understood that "forward" and "reverse" are relative terms, not intended to limit the scope of the invention; other terms may be equally used for indicating that the traffic is counter-propagating in the two fibers of the ring.

The spans, or ring sectors between two nodes are denoted on FIG. 1 by letters A to E respectively. Each node is connected to an associated edge switch 1' to n', which manipulate the add/drop wavelengths from/to a respective user.

FIG. 1 also shows three bidirectional connections, for defining some terms used in this specification. Nodes 1 and 3 are bidirectionally connected along a forward channel 22 on fiber 20, and a reverse channel 22' on fiber 21. Nodes 1 and 3 are terminal nodes for these channels, and node 2 is an intermediate node, as channels 22, 22' pass through node 2.

FIG. 1 also shows a bidirectional connection between nodes 1 and n-1 on forward channel 24 and reverse channel 24', through intermediate node n, and another bidirectional connection between adjacent nodes n and n-1 on forward channel 23 and reverse channel 23'. It is apparent that the span between nodes n and n-1 is shared by channels 23 and 24 in the forward direction, and by channels 23' and 24' in the reverse direction.

Connections 22, 22' and 24, 24' are two hop connections, while connection 23, 23' is a one hop connection. Node n of FIG. 1 adds channel 23', drops channel 23 and passes through channels 24 and 24'. Additional wavelengths, not shown, will also be passed through node n when this node is located between the source and destination nodes.

n is defined herein as the number of add-drop nodes per ring, and N, as the number of wavelengths per fiber span. For example, in FIG. 1, N=2 for span D. Of course, the number of channels (wavelengths) per span could be much higher and is limited by the current available fiber technology.

Each node requires at least one wavelength to each other node in a fully connected meshed network. These wavelengths must be different in order to use a single add drop multiplexer per node. Therefore the add/drop requirement for an ADM node, or the number of channels added/dropped is:

$$N_a = n-1 \qquad \text{Eq1}$$

With two unidirectional fibers per dual ring, there are two paths between each node pair. It is apparent from FIG. 1 that, for example, any of channels 22 or 22' may take an alternate route (not shown), passing through intermediate nodes n and n-1. Selection of one or the other of the routes depends on the particular design of the network. Nonetheless, electing the shortest path is generally preferable in that it minimizes the umber of wavelengths per fiber.

Figure 2B:
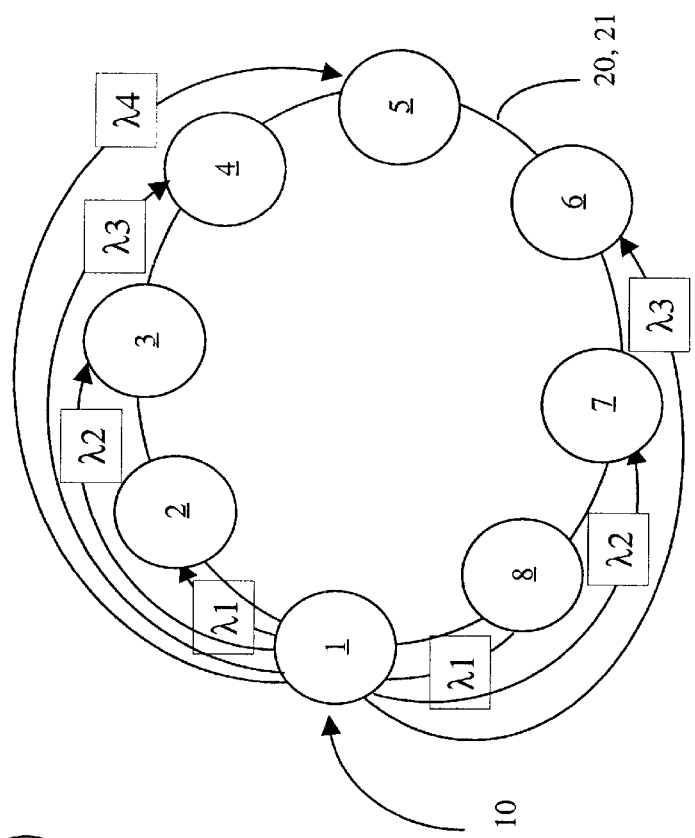
FIG. 2B illustrates a ring network with an even number of nodes and the channels for connecting a node with all other nodes
Figure 2A:
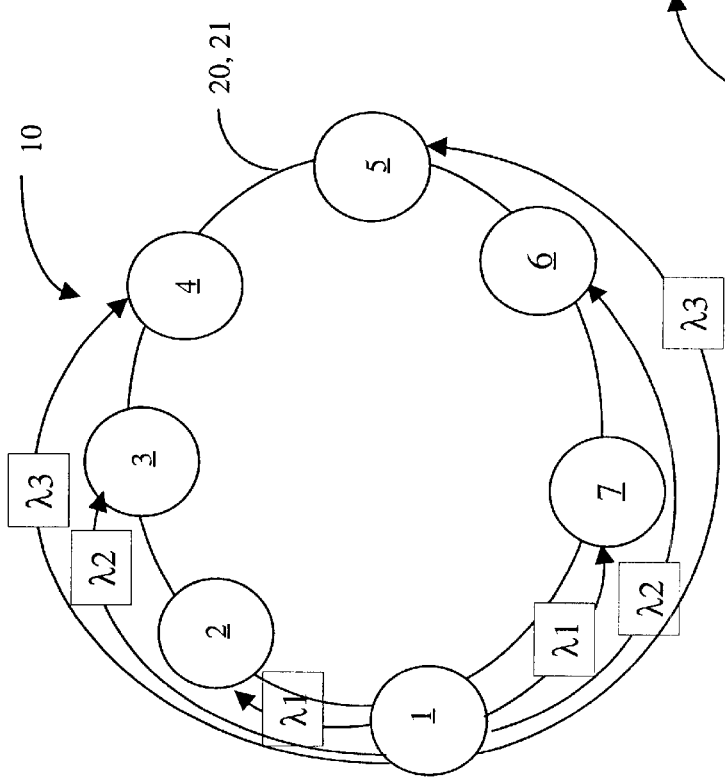
FIG. 2A illustrates a ring network with an odd number of nodes and the channels for connecting a node with all other nodes.

For a ring with an odd number of nodes, there are (n-1)/2 destinations n each unidirectional fiber. An example is shown in FIG. 2A for a ring 10 with seven nodes 1–7 (n=7). The add/drop requirement for node 1 is $N_a=(7-1)/2=3$, i.e. the node adds six wavelengths, and there are three destinations on each fiber, i.e. (7-1)/2=3. Thus, node 1 is connected to nodes 2, 3 and 4 in the forward direction using three wavelengths, i.e. (n-1)/2=3, and with nodes 5, 6 and 7 in the reverse direction also using three wavelengths.

For a ring with an even number of nodes, there are n/2 destinations on one fiber and n/2-1 on the other. An example is shown in FIG. 2B, for a ring 10 with eight nodes (n=8). The add/drop requirement for node 1 is in this case $N_a=(8-1)/2=3.5$, meaning that on average, node 1 sends traffic to 3.5 destinations to each of the two fibers. As a result, there are three destinations on one fiber and four destinations on the other fiber. FIG. 2B shows node 1 is connected with nodes 2, 3, 4 and 5 in the forward direction using four wavelengths (i.e. 8/2=4), and with the nodes 6, 7 and 8 in the reverse direction using three wavelengths (i.e. 8/2-1=3).

If a ring has n nodes, each unidirectional fiber connects n×(n-1)/2 source-destination pairs. Defining E[H] the average number of hops between two nodes in a ring, the n(n-1)/2 source-destination pairs of a unidirectional fiber require E[H]×n(n-1)/2 units of wavelengths×fiber segments, or E[H]×(n-1)/2 wavelengths per fiber. Therefore, the minimum number of wavelengths per fiber, denoted herein by $N_f$, is:

$$N_f = \frac{n-1}{2} E[H] \qquad \text{Eq2}$$

Selecting the minimum path between two nodes leads to:

$$E[H] = \frac{\text{even}(n)\text{even}(n-1)}{4(n-1)} = \begin{cases} \frac{n+1}{4} & \text{if } n \text{ is odd} \\ \frac{n^2}{4(n-1)} & \text{if } n \text{ is even} \end{cases} \quad \text{Eq3}$$

where even(n) is the lowest even number greater or equal to n, and $$N_f = \frac{\text{even}(n)\text{even}(n-1)}{8} = \begin{cases} \frac{n^2-1}{8} & \text{if } n \text{ is odd} \\ \frac{n^2}{8} & \text{if } n \text{ is even} \end{cases} \quad \text{Eq4}$$

The minimum number of wavelengths required thus satisfies:

$$N \geq \max(N_a, N_f) = \max\left(n-1, \frac{\text{even}(n)\text{even}(n-1)}{8}\right) \quad \text{Eq5}$$

$$= \begin{cases} \max\left(n-1, \frac{n^2-1}{8}\right) & \text{if } n \text{ is odd} \\ \max\left(n-1, \frac{n^2}{8}\right) & \text{if } n \text{ is even} \end{cases}$$

This is a necessary condition. It can be shown that this bound is always the tightest, and it gives exactly the minimum number of wavelengths required.

Table 1 shows these values for various odd numbers of nodes per ring.

TABLE 1

Lower bound on wavelength requirement for rings with odd numbers of nodes

| No. of nodes per ring (n) | Add/drop requirement $N_a = n - 1$ | Fiber requirement $N_f = (n^2 - 1)/8$ | Wavelength requirement $N \geq \max(N_a, N_f)$ |
|---|---|---|---|
| 3 | 2 | 1 | 2 |
| 5 | 4 | 3 | 4 |
| 7 | 6 | 6 | 6 |
| 9 | 8 | 10 | 10 |
| 11 | 10 | 15 | 15 |
| 13 | 12 | 21 | 21 |
| 15 | 14 | 28 | 28 |

For n=7, the two requirements, $N_a$ and $N_f$, are equal and thus every wavelength is added and dropped at each node and each wavelength is used on all unidirectional segments of the ring. Since each wavelength is used on each of the two fibers, half of the wavelengths of a unidirectional fiber are added/dropped and the other half of the wavelengths are added/dropped on the other fiber.

For n<7, $N_f<N_a$, and thus not all wavelengths need to be used on all unidirectional segments of the ring if the shortest path between two nodes is always used, or the shortest path does not have to be used.

The fiber requirement is limiting for n>7, and thus all wavelengths are used on all unidirectional segments of the ring, but some wavelengths are not added/dropped at some nodes. The number of wavelengths that only pass through a node is:

$$U = \frac{n^2-1}{8} - n - 1 = \frac{(n-1)(n-7)}{8} \text{ for } n \geq 7 \quad \text{Eq6}$$

Table 2 shows the wavelength requirements for even numbers of nodes per ring.

TABLE 2

Lower bound on wavelength requirement for even numbers of nodes

| No. of nodes per ring (n) | Add/drop requirement $N_a = n - 1$ | Fiber requirement $N_f = n^2/8$ | Wavelength requirement $N \geq \max(N_a, N_f)$ |
|---|---|---|---|
| 4 | 3 | 2.0 | 3 |
| 6 | 5 | 4.5 | 5 |
| 8 | 7 | 8.0 | 8 |
| 10 | 9 | 12.5 | 13 |
| 12 | 11 | 18.0 | 18 |
| 14 | 13 | 24.5 | 25 |
| 16 | 15 | 32.0 | 32 |

In this case, the fiber requirement is not always an integer number. For example, for n=10, using 12 wavelengths would not be sufficient, and with 13 wavelengths, not all wavelengths need to be used on every segment. For $n \leq 6$, $N_f < N_a$, and thus not all wavelengths need to be used on all unidirectional segments of the ring, if the shortest path between two nodes is always used, or the shortest path does not have to be used. The fiber requirement is limiting for $n \geq 8$.

Wavelength Allocation for Rings with an Odd Number of Nodes, and $n \geq 7$

A wavelength allocation method is disclosed next, for a ring with an odd number of nodes, providing a fully-meshed network with the minimum number of wavelengths when the fiber requirement is the limiting constraint (i.e., for $n \geq 7$). Note that other solutions using the same number of wavelengths exist.

Since for $n \geq 7$, the fiber requirement is the limiting constraint, each wavelength must be used on all spans. Therefore, the solution consists in creating, for each wavelength, a list of add/drop nodes that use the wavelength to communicate with their neighbors from the list.

This list forms a loop: the first and last nodes are neighbors. In addition, each node must add and drop a wavelength only once, and thus the forward and reverse direction lists of a wavelength must consist of different nodes. Furthermore, each node must be connected to every other node.

These design restrictions result in satisfying the following conditions:
each wavelength must have different add/drop nodes per direction, i.e., every wavelength is used once and only once on every fiber; and
each node must have every hop from 1 to max=(n−1)/2, once and only once in both directions, i.e., every node is connected to every other node.

Wavelengths are allocated to each node of the WDM ring 10 by first preparing an allocation table (or a hop table) for both the forward and reverse directions, using the above constraints.

Index j is used for the range of the node in the ring, j=1, 2, ... n. A hop is denoted with $h_j$, where j gives the starting node for the respective hop and $j+h_j$ gives the destination node. As the allocation may begin at any node, the initial node for a certain wavelength is denoted with j0.

Indexes i and k are used for the range of the wavelengths; i is the range of the wavelength between 1 and $N_f$, and k is the index for the wavelength for source-destination loops beginning at the same initial node.

In the tables, "1" indicates a hop of 1 in the forward direction, e.g. from node 1 to node 2, "(1)" indicates a hop of 1 in the reverse direction, e.g. from node 3 to node 2, and X indicates no connection.

Forward direction

The wavelength allocation for the forward direction is described in connection with the flowchart of FIG. 3 and the example of Table 3.

Figure 3:
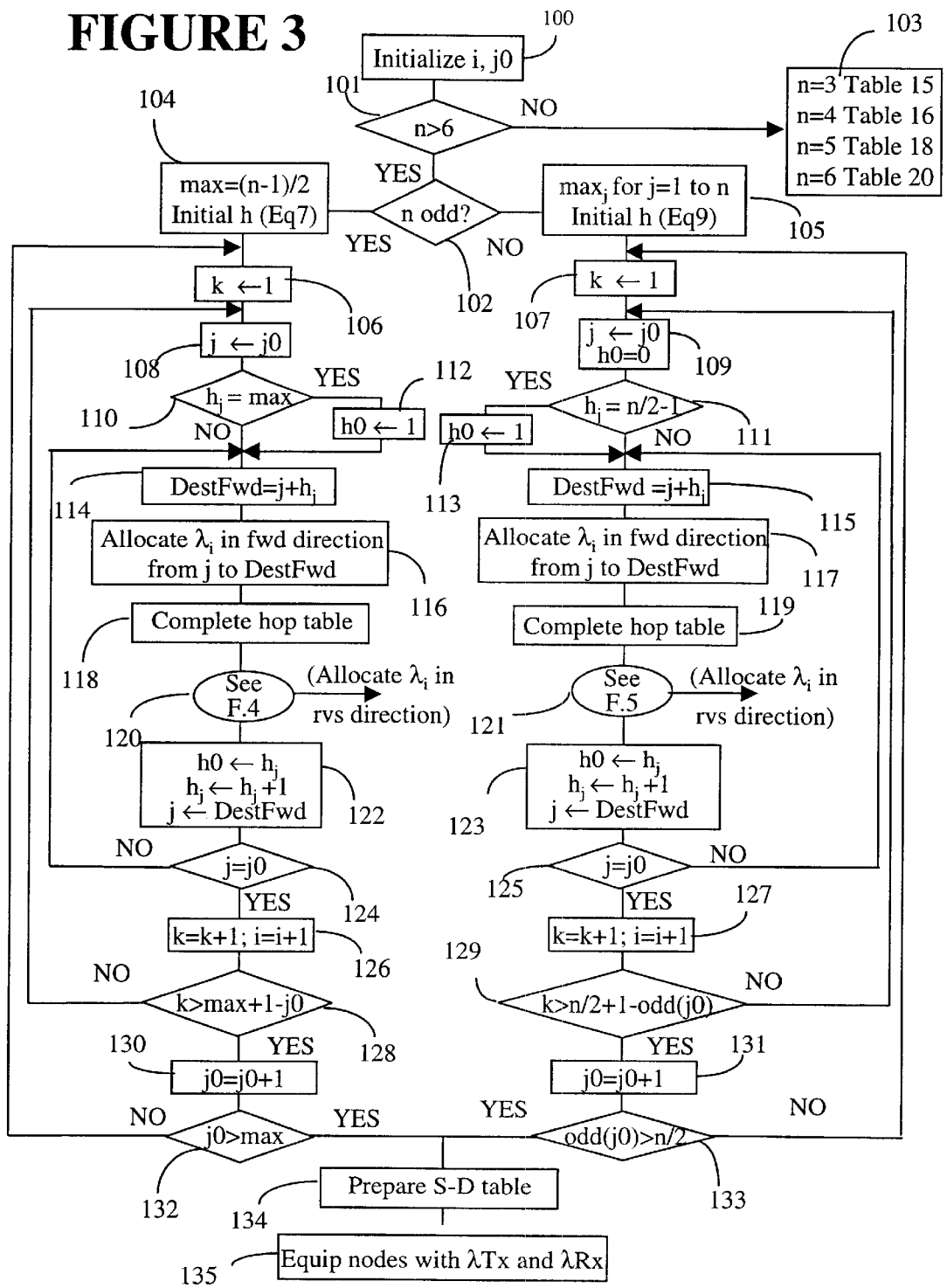
FIG. 3 is a flowchart of the wavelength-node allocation for a fully connected ring network.

The first steps 100, 101 and 102 of the flowchart of FIG. 3 are concerned with initializing i and j0, and determining if the ring has more than 6 nodes and has an odd or even number of nodes.

If n is odd and greater than 6, the value for max is calculated for the respective ring in step 104. Table 1 gives the number of wavelengths needed to fully connect the nodes of a ring as the maximum of $N_a$ and $N_f$. As indicated above, max is the maximum hop for a wavelength, and is (n−1)/2.

The initial hop vector is calculated in step 104 as follows:

$$\vec{h} = (1, \max, \max-1, \ldots, 2, 1, \max, \max-1, \ldots, 2, 1),$$

or $$\vec{h} = \{h_j\} \text{ where } h_j = \begin{cases} 1 & \text{if } j = 1, \\ \max + 2 - j & \text{if } 2 \le j \le \max + 1 \\ n + 1 - j & \text{if } \max + 2 \le j \le n \end{cases} \quad \text{Eq7}$$

Table 3 illustrates an example of a ring with n=7. In this case the number of wavelengths necessary for fully connecting all nodes is 6 (as shown in Table 1) and max=3 for both the forward and the reverse fibers.

TABLE 3

Hop table used to obtain wavelength allocation for n = 7.

| Wavelength | Added/dropped at node | | | | | | |
|---|---|---|---|---|---|---|---|
|  | 1 | 2 | 3 | 4 | 5 | 6 | 7 |
| $\lambda_0$ | 1 | 3 | (3) | (1) | 3 | (2) | (1) |
| $\lambda_1$ | 2 | (2) | 2 | (2) | 1 | 2 | (3) |
| $\lambda_2$ | 3 | (3) | (1) | 1 | 2 | (3) | 1 |
| $\lambda_3$ | (1) | 1 | 3 | (3) | (1) | 3 | (2) |
| $\lambda_4$ | (3) | 2 | (2) | 2 | (2) | 1 | 2 |
| $\lambda_5$ | (2) | (1) | 1 | 3 | (3) | (1) | 3 |

Completion of the hop table starts with the first wavelength $\lambda_0$(i=0, k=1) and node 1 (j=j0). Let's apply the flowchart of FIG. 3 to the example of seven nodes. We define the origin of hop Table 3 at the intersection of $\lambda_0$ with node $j_1$, which is always a hop of 1. As n=7 in this example, the steps along branch YES of decision block 102 must be performed, i.e. the steps for a ring with an odd number of nodes. Step 104 gives max=3, and the initial hop vector is calculated using Eq7, which gives: $h_1$=1, $h_2$=3, $h_3$=2, $h_4$=1, $h_5$=3, $h_6$=2, and $h_7$=1.

As indicated above, the index k for the first source-destination loop starting at node 1 has k=1, step 106, and the initial node for this loop denoted with j0 is node 1, j0=1, as shown in step 108. j0 is used as the initial node for the general case where the allocation begins at any node, not necessarily at node 1.

In step 110, since $h_1$ is not max, h0 is not initialized to 1. The destination node (DestFwd) is determined by adding $h_1$ to the source node j in step 114, which gives DestFwd=2. $\lambda_0$ is allocated to the span between the initial node and the destination node, as shown in step 116, which means in the present case that node 1 is connected to node 2 over $\lambda_0$.

This information is recorded in hop Table 3, step 118, and used for preparing the hop table for the reverse direction, step 120, which is shown in detail on FIG. 4 and explained in detail later.

Step 122 illustrates how parameters are updated for the following allocations. Variable h0 stores the value of the last hop, here $h_1$=1. $h_j$ is incremented by one for the next hop allocated from node j (using another wavelength). If a hop $h_j$+1 is greater than max, its value is adjusted to 1. In other words, this is a mod($h_j$, max)+1 operation. For the present example, the current hop vector has the following values: $h_1$=2 (incremented), $h_2$=3 (unchanged), $h_3$=2 (unchanged), $h_4$=1 (unchanged), $h_5$=3 (unchanged), $h_6$=2 (unchanged), and $h_7$=1, (unchanged). Also, j assumes the value of the last destination node, in this example j=2.

Since j=2 is not equal to j0=1, then we go back to step 114. The next allocation for $\lambda_j$ follows the same steps given above. Node 2, which has $h_2$=3, is connected to node 5 on same $\lambda_0$, and node 5, which has a hop of $h_5$=3 is connected to node 1. As such, wavelength $\lambda_0$ hops between nodes 1, 2, 5 and back to node 1. The source and destination nodes and the wavelength are recorded in a source-destination table (see Table 5), as shown in step 118. As we arrived back at node 1, the first forward connection on $\lambda_0$ is terminated. This is identified by meeting condition 124. In step 126, i and k are incremented, so that the next allocation is concerned with the second loop (k=2) form node 1, and the second wavelength overall ($\lambda_1$).

As indicated in step 124, steps 114–122 are repeated until j becomes j0, which indicates that the respective wavelength reached the initial node, i.e. the loop is closed. For the second loop, node 1 ($h_1$=2) is connected to node 3, node 3 ($h_3$=2) is connected to node 5, node 5 ($h_5$=1) is connected to node 6, and node 6, ($h_6$=2), to 1 using $\lambda_1$.

Next, we connect wavelength $\lambda_2$ and $\lambda_3$ in a similar way. After all first hops were recorded for the respective node 1, which is indicated by condition 128, meaning that all wavelengths for the forward directions were "added" at that node, the first hop for the next wavelength begins at the next node, step 130. In the example given herein, as the first hop for $\lambda_2$ has reached maximum, the first hop for $\lambda_3$ starts at node 2, and so on, until Table 3 is completed for the forward direction. Steps 106–132 are repeated for each node until j0 becomes greater than max, shown by branch NO at step 132.

There will be max wavelengths allocated starting from node 1, then max−1 wavelengths from node 2, since node 2 has been used once from node 1, max−2 wavelength allocations from node 3, and so on, until one wavelength allocation starting from node max−1. In general, there are max+1−j wavelength allocations starting from a node j.

The source-destination table is now complete for the forward direction, indicating the wavelength that connect all pair of nodes of the ring, step 134.

To summarize, steps 114 to 124 are repeated until a certain wavelength effects a complete loop starting at node j0 and ending on node j0. Steps 108 to 128 are repeated, until all loops having source node j0 are exhausted. Steps 106 to 132 are repeated until all wavelengths are allocated around the ring.

Reverse Direction

Figure 4:
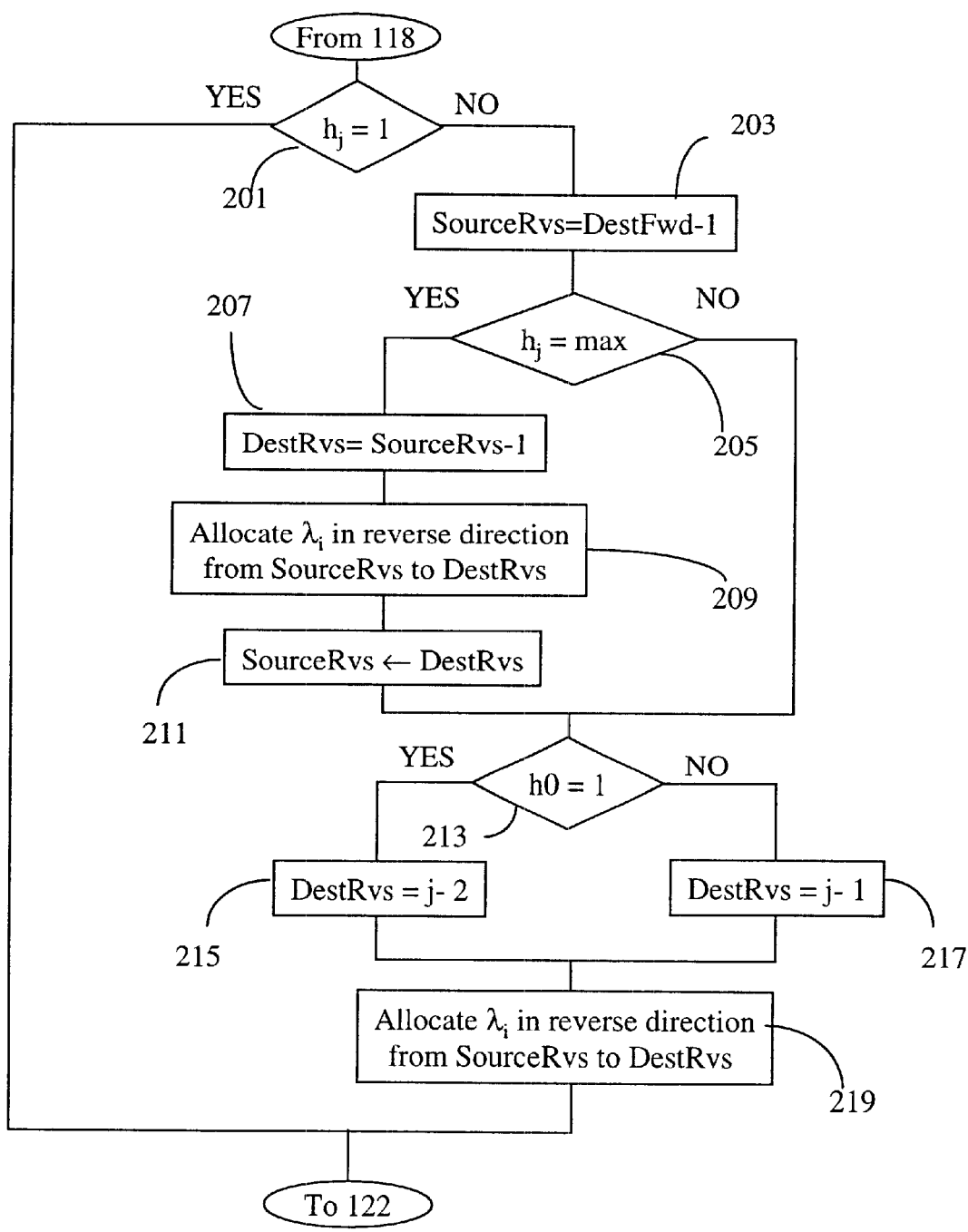
FIG. 4 is a detail of the flowchart of FIG. 3, illustrating the wavelength allocation for the reverse direction, for a ring with an odd number of nodes.
Figure 5:
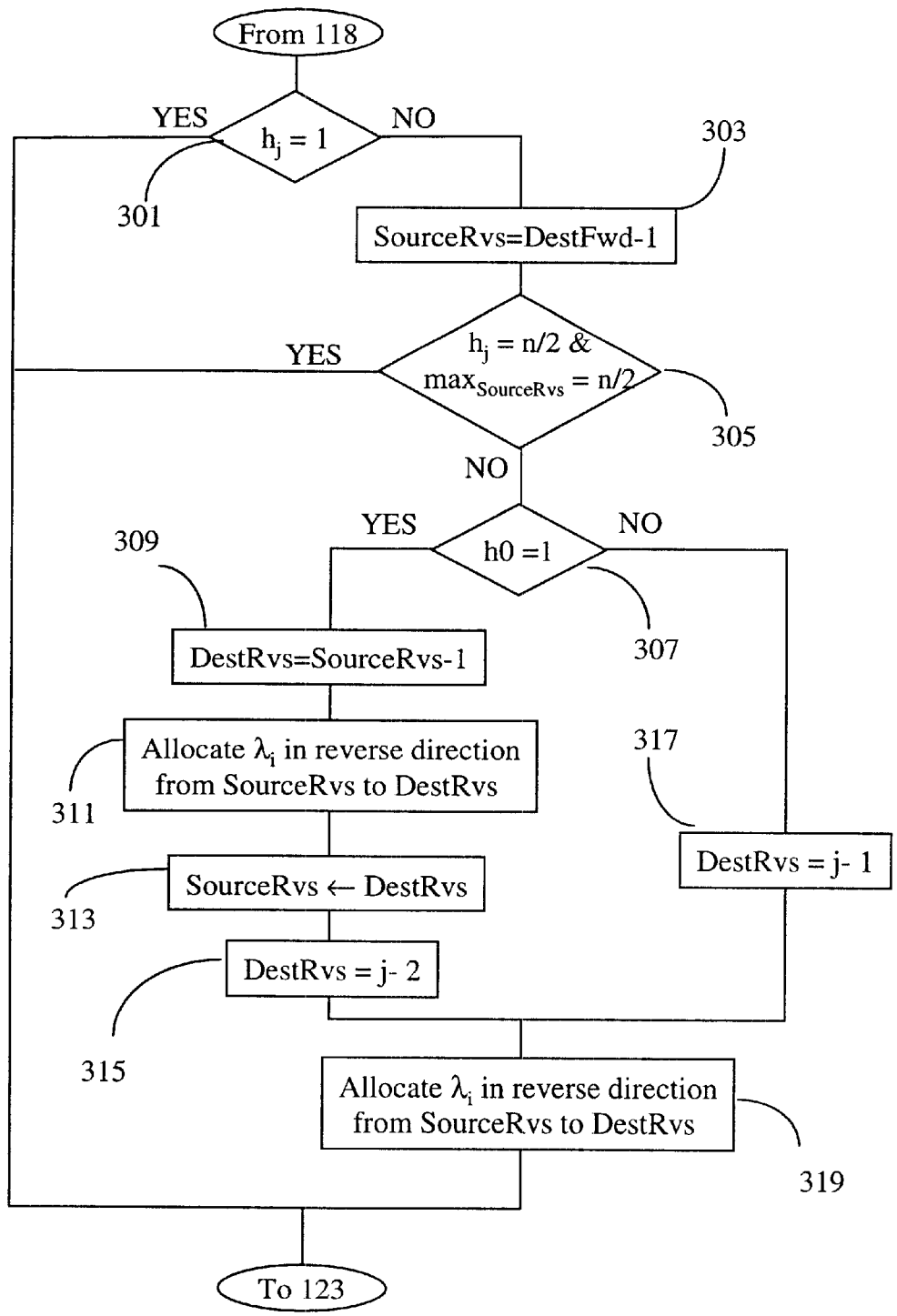
FIG. 5 is a detail of the flowchart of FIG. 3, illustrating the wavelength allocation for the reverse direction, for a ring with an even number of nodes.

The reverse direction is determined from the forward direction hop sequence, as shown by step 120, and illustrated in detail by the flowchart of FIG. 4. Moreover, the reverse hops are determined taking into the account certain successions of hops in the forward direction.

We use the trivial observation that the node preceding an add/drop node is idle unless it was reached by a hop of 1. Another observation of use is that, as also seen on Tables 5 and 7 provided next for the 9 and respectively 11 nodes, a hop of 1 is followed by a hop of either max or max−1. Hops of 1, max and max−1 in the reverse direction must be determined so that they are used the same number of times, and that they do not collide with the forward direction.

Using the notation (g) for a hop of g in the reverse direction, the method of the invention uses the following rules:

direction, and SourceRvs node becomes the DestRev for the next reverse hop, step 211.

For a forward direction previous hop h0 of 1, step 213, DestRvs node for the next hop is one node before the forward direction previous source node (hop of 1), and thus j−2, where j is the current forward direction source node, step 215. If the forward direction previous hop h0 is different than 1, DestRvs is one node before the forward direction source node or j−1, step 217. The allocation table is completed with the respective source and destination nodes for the current hop, step 219.

These cases are shown in Table 4.

TABLE 4

Reverse direction hop allocation based on the forward allocation

| Direction | Node | | | | | | |
|---|---|---|---|---|---|---|---|
| | j − 1 | j | J + 1 | ... | max + j − 1 | max + j | max + j + 1 |
| forward | | 1 | max | | | | x |
| reverse | (x) | | | | (max) | (1) | |
| forward | | 1 | max − 1 | | | x | |
| reverse | (x) | | | | (max) | | |
| forward | | max | | | | x | |
| reverse | (x) | | | (max − 1) | (1) | | |

| | Node | | | | | |
|---|---|---|---|---|---|---|
| | j − 1 | j | j + 1 | ... | j + g − 1 | j + g |
| forward | | g < max | | | | x |
| reverse | (x) | | | | (g) | | for a forward direction hop succession (1, max), there will be a hop of (1) followed by a hop of (max) in the reverse direction starting at the node preceding the destination node of the hop of max. Since max≧3 for n≧7, there are at least two nodes available for the reverse direction, and therefore there are enough nodes available in the ring.

for a forward hop succession of 1, max−1, there will be a hop of (max) in the reverse direction, starting at the node before the destination node. Since max−1 may be equal to 2, there may be only one node available for the reverse direction, and it will be used by this method.

for a forward hop sequence of max not preceded by a hop of 1, there will be, in the reverse direction, a hop of (1) starting at the node before the destination node, followed by a hop of (max−1). With the previous two sequences, this is required to ensure that all hops are made.

for any other hop of g, 2≦g≦max−1, not preceded by a hop of 1, there will be a hop of (g) starting at the node before the destination node of the hop of g.

The flowchart of FIG. 4 was designed taking into account the above considerations.

Thus, for a h$_j$ other than 1 in the forward direction, step 201, the source node for the reverse hop, denoted with SourceRvs, is the node immediately before the destination node in the forward direction, DestFwd, as shown in step 203. If SourceRvs≦0, then n is added to Source Rvs. This is done for every subsequent subtraction in the reverse direction allocation.

If the respective forward hop h$_j$ is a maximum hop, the destination node for the reverse direction (DestRvd) is calculated by decreasing the SourceRvs by 1 in step 207. In this case, wavelength λ$_i$ is allocated in the reverse direction from the SourceRvs to the DestRvs, as shown in step 209. In other words, a hop of 1 takes place in the reverse "1" indicates a hop of 1 in the forward direction; "(1)" indicates a hop in the reverse direction; g is any hop different than 1 and max, "x" or "(x)" indicate that the wavelength is added or dropped at the node; and a blank indicates that the wavelength is not added or dropped at the node.

Table 4 shows that the reverse direction hops do not collide with the forward direction. In addition, these rules are based on forward direction sequences that cover every node once and only once. Except for the second and third sequences of Table 4, each time there is a hop in the forward direction, there is the same hop in the reverse direction. The second and third sequences of Table 4 each occur max times, and together have hops of 1, max−1 and max in both directions.

Consequently, the reverse direction provides each hop from 1 to max from every node and thus connects every node to every node once and only once.

Table 5 gives the source destination nodes for each wavelength in a seven node ring (n−7).

TABLE 5

Source-destination table for the wavelength allocation with n = 7 nodes

| Source node | Destination node | | | | | | |
|---|---|---|---|---|---|---|---|
| | 1 | 2 | 3 | 4 | 5 | 6 | 7 |
| 1 | X | 0 | 1 | 2 | (4) | (5) | (3) |
| 2 | (5) | X | 3 | 4 | 0 | (2) | (1) |
| 3 | (4) | (2) | X | 5 | 1 | 3 | (0) |
| 4 | (3) | (1) | (0) | X | 2 | 4 | 5 |
| 5 | 0 | (5) | (4) | (3) | X | 1 | 2 |

TABLE 5-continued

Source-destination table for the wavelength allocation with n = 7 nodes

| Source node | Destination node | | | | | | |
|---|---|---|---|---|---|---|---|
| | 1 | 2 | 3 | 4 | 5 | 6 | 7 |
| 6 | 1 | 3 | (2) | (0) | (5) | X | 4 |
| 7 | 2 | 4 | 5 | (1) | (3) | (0) | X |

Here, "0" indicates wavelength $\lambda_0$ in the forward direction, and "(0)" indicates wavelength $\lambda_0$ in the reverse direction, and X indicates no connection.

The following Tables 6 and 7 show the wavelength allocations (hop table) resulted using this method for a ring with nine nodes (n=9), and the source-destination node for each wavelength in such a ring (the source-destination table). In this case, $N_f=(9^2-1)/8=10$, $N_a=9-1=8$, $N=10$ and max=4.

TABLE 6

Hop table for the wavelength allocation with n = 9

| Wavelength | Added/dropped at node | | | | | | | | |
|---|---|---|---|---|---|---|---|---|---|
| | 1 | 2 | 3 | 4 | 5 | 6 | 7 | 8 | 9 |
| $\lambda_0$ | 1 | 4 | X | (4) | (1) | 4 | X | (3) | (1) |
| $\lambda_1$ | 2 | (2) | 3 | X | (3) | 1 | 3 | X | (4) |
| $\lambda_2$ | 3 | X | (3) | 2 | (2) | 2 | (2) | 2 | (2) |
| $\lambda_3$ | 4 | X | (4) | (1) | 1 | 3 | X | (4) | 1 |
| $\lambda_4$ | (1) | 1 | 4 | X | (4) | (1) | 4 | X | (3) |
| $\lambda_5$ | (4) | 2 | (2) | 3 | X | (3) | 1 | 3 | X |
| $\lambda_6$ | (2) | 3 | X | (3) | 2 | (2) | 2 | (2) | 2 |
| $\lambda_7$ | (3) | (1) | 1 | 4 | X | (4) | (1) | 4 | X |
| $\lambda_8$ | X | (4) | 2 | (2) | 3 | X | (3) | 1 | 3 |
| $\lambda_9$ | X | (3) | (1) | 1 | 4 | X | (4) | (1) | 4 |

In this hop table, "1" and "(1)" represent a hop in a respective forward and reverse directions, and X indicates no connection.

TABLE 7

Source-destination table for the wavelength allocation with n = 9 nodes

| Source node | Destination node | | | | | | | | |
|---|---|---|---|---|---|---|---|---|---|
| | 1 | 2 | 3 | 4 | 5 | 6 | 7 | 8 | 9 |
| 1 | X | 0 | 1 | 2 | 3 | (5) | (7) | (6) | (4) |
| 2 | (7) | X | 4 | 5 | 6 | 0 | (8) | (9) | (1) |
| 3 | (5) | (9) | X | 7 | 8 | 1 | 4 | (3) | (2) |
| 4 | (6) | (8) | (3) | X | 9 | 2 | 5 | 7 | (0) |
| 5 | (4) | (1) | (2) | (0) | X | 3 | 6 | 8 | 9 |
| 6 | 0 | (7) | (5) | (6) | (4) | X | 1 | 2 | 3 |
| 7 | 1 | 4 | (9) | (8) | (2) | (7) | X | 5 | 6 |
| 8 | 2 | 5 | 7 | (3) | (0) | (6) | (9) | X | 8 |
| 9 | 3 | 6 | 8 | 9 | (1) | (4) | (2) | (0) | X |

In this table, "1" and "(1)" represent a wavelengths travelling in the respective forward and reverse directions, and X indicates no connection, i.e. the wavelength passes through the node in both directions.

Tables 8 and 9 are the hop and the source-destination tables, respectively, resulted using this method for a ring with 11 nodes (n=11). In this case $N_f=(11^2-1)/8=15$, $N_a=11-1=10$, $N=15$ and max=5.

TABLE 8

Hop table for the wavelength allocation with n = 11

| Wavelength | Added/dropped at Node | | | | | | | | | | |
|---|---|---|---|---|---|---|---|---|---|---|---|
| | 1 | 2 | 3 | 4 | 5 | 6 | 7 | 8 | 9 | 10 | 11 |
| $\lambda_0$ | 1 | 5 | X | X | (5) | (1) | 5 | X | X | (4) | (1) |
| $\lambda_1$ | 2 | (2) | 4 | X | X | (4) | 1 | 4 | X | X | (5) |
| $\lambda_2$ | 3 | X | (3) | 3 | X | (3) | 2 | (2) | 3 | X | (3) |
| $\lambda_3$ | 4 | X | X | (4) | 2 | (2) | 3 | X | (3) | 2 | (2) |
| $\lambda_4$ | 5 | X | X | (5) | (1) | 1 | 4 | X | X | (5) | 1 |
| $\lambda_5$ | (1) | 1 | 5 | X | X | (5) | (1) | 5 | X | X | (4) |
| $\lambda_6$ | (5) | 2 | (2) | 4 | X | X | (4) | 1 | 4 | X | X |
| $\lambda_7$ | (3) | 3 | X | (3) | 3 | X | (3) | 2 | (2) | 3 | X |
| $\lambda_8$ | (2) | 4 | X | X | (4) | 2 | (2) | 3 | X | (3) | 2 |
| $\lambda_9$ | (4) | (1) | 1 | 5 | X | X | (5) | (1) | 5 | X | X |
| $\lambda_{10}$ | X | (5) | 2 | (2) | 4 | X | X | (4) | 1 | 4 | X |
| $\lambda_{11}$ | X | (3) | 3 | X | (3) | 3 | X | (3) | 2 | (2) | 3 |
| $\lambda_{12}$ | X | (4) | (1) | 1 | 5 | X | X | (5) | (1) | 5 | X |
| $\lambda_{13}$ | X | X | (5) | 2 | (2) | 4 | X | X | (4) | 1 | 4 |
| $\lambda_{14}$ | X | X | (4) | (1) | 1 | 5 | X | X | (5) | (1) | 5 |

In this table, "1" and "(1)" represents a hop in the respective forward and reverse direction.

TABLE 9

Source-destination table for the wavelength allocation with n = 11 nodes

| Source node | Destination Node | | | | | | | | | | |
|---|---|---|---|---|---|---|---|---|---|---|---|
| | 1 | 2 | 3 | 4 | 5 | 6 | 7 | 8 | 9 | 10 | 11 |
| 1 | X | 0 | 1 | 2 | 3 | 4 | (6) | (9) | (7) | (8) | (5) |
| 2 | (9) | X | 5 | 6 | 7 | 8 | 0 | (10) | (12) | (11) | (1) |
| 3 | (6) | (12) | X | 9 | 10 | 11 | 1 | 5 | (13) | (14) | (2) |
| 4 | (7) | (10) | (14) | X | 12 | 13 | 2 | 6 | 9 | (4) | (3) |
| 5 | (8) | (11) | (13) | (4) | X | 14 | 3 | 7 | 10 | 12 | (0) |
| 6 | (5) | (1) | (2) | (3) | (0) | X | 4 | 8 | 11 | 13 | 14 |
| 7 | 0 | (9) | (6) | (7) | (8) | (5) | X | 1 | 2 | 3 | 4 |
| 8 | 1 | 5 | (12) | (10) | (11) | (2) | (9) | X | 6 | 7 | 8 |
| 9 | 2 | 6 | 9 | (14) | (13) | (3) | (7) | (12) | X | 10 | 11 |

TABLE 9-continued

Source-destination table for the wavelength allocation with n = 11 nodes

| Source node | Destination Node | | | | | | | | | | |
|---|---|---|---|---|---|---|---|---|---|---|---|
| | 1 | 2 | 3 | 4 | 5 | 6 | 7 | 8 | 9 | 10 | 11 |
| 10 | 3 | 7 | 10 | 12 | (4) | (0) | (8) | (11) | (14) | X | 13 |
| 11 | 4 | 8 | 11 | 13 | 14 | (1) | (5) | (2) | (3) | (0) | X |

In this table, "1" and "(1)" represent a wavelengths travelling in the respective forward and reverse directions.

Wavelength Allocation for Rings with an Even Number of Nodes, and n≧8

For even n≧8, the number of wavelengths per fiber, $N_p$, is limiting. The method is similar as for odd n≧7, but requires some minor modifications to ensure that wavelengths are used on all fibers when required. As seen from Table 2, when n/2 is odd, $N_f$ is not an integer and one wavelength is not used in one direction.

As in the case of, rings with an odd number of nodes, the hop list forms a loop: the first and last nodes are neighbours. In addition, each node must add/drop a wavelength only once, and thus the forward and reverse direction lists of a wavelength must consist of different nodes. Furthermore, each node is connected to every other node.

Forward Direction

The flowchart for the case when n is even is similar with the flowchart for the even number of nodes, with some exceptions in the way the parameter of the loops are calculated. Thus, the maximum hop from each node, which was constant at max=(n−1)/2 for odd number of nodes, is either n/2 or n/2−1 for this case, as follows:

$$\max_j = \begin{cases} n/2 & \text{if } \left(1 \le j \le \frac{n}{2}\right) \text{ and } (j \text{ is odd}) \\ n/2 - 1 & \text{if } \left(1 \le j \le \frac{n}{2}\right) \text{ and } (j \text{ is even}) \\ n/2 & \text{if } \left(\frac{n}{2} + 1 \le j \le n\right) \text{ and } \left(j - \frac{n}{2} \text{ is odd}\right) \\ n/2 - 1 & \text{if } \left(\frac{n}{2} + 1 \le j \le n\right) \text{ and } \left(j - \frac{n}{2} \text{ is even}\right) \end{cases} \quad \text{Eq8}$$

The initial hop vector is different from the one used for odd number of nodes and again has a different value from that in the case of the odd number of nodes. It is initialized as:

$$\vec{h} = (1, n/2-1, \ldots, 2, 1, 1, n/2-1, \ldots, 2, 1)$$

or $$\vec{h} = \{h_j\} \text{ where } h_j = \begin{cases} 1 & \text{if } j = 1 \\ \frac{n}{2} + 1 - j & \text{if } 2 \le j \le \frac{n}{2} \\ 1 & \text{if } j = \frac{n}{2} + 1 \\ n + 1 - j & \text{if } \frac{n}{2} + 2 \le j \le n \end{cases} \quad \text{Eq9}$$

These differences are shown in step 105.

Each time a hop is used from a node j, the corresponding hop $h_j$ is incremented by 1, until it reaches $\max_j+1$, in which case, it is set to 1. As for odd number of nodes, the first wavelength is allocated starting from node 1, and hops are selected using vector $\vec{h}$ until the initial node is reached. There are n/2 wavelengths allocated starting from node 1, followed by n/2−2 wavelengths from node 2 and node 3, n/2−4 wavelength allocations from nodes 4 and 5, and n/2+1−odd(j) wavelength allocations starting from node j as long as odd(j)≦n/2 where odd(j) is the lowest odd number greater or equal to j.

In this case, steps 115 to 125 are repeated until a certain wavelength effects a complete loop, starting from an initial node j0 and returning to the same node. Steps 109 to 129 are repeated, according to the above rules, until all loops having a certain source node are exhausted. Finally, steps 107 to 133 are repeated until all wavelengths are allocated to all nodes.

Further differences between the method for rings with odd and rings with even numbers of nodes, are in the conditions imposed in steps 129 and 133. Thus, in step 129 k is compared with n/2+1−odd(j), rather than with max+1−j0 as it is in the corresponding step 128 for an odd n. Furthermore, the condition for initiating a new loop for a new node which is j0>max for an odd n, becomes odd(j0)>n/2, as shown in step 133.

Finally, the source destination table is completed for both forward and reverse directions, as shown at step 134 on FIG. 3, and the nodes are equipped with transmitters and receivers for the respective wavelength that are added and/or dropped at the node, step 135.

Reverse Direction

The reverse direction is determined from the forward direction hop sequence. A hop of 1 is always followed by a hop of n/2−1, which simplifies the reverse direction sequence compared to the odd number of nodes. The rules for reverse direction are:

for a hop forward succession (1, n/2−1), then starting at the node preceding the destination node of the hop of max, there will be a hop of (1) followed by a hop of (n/2−1) in the reverse direction, and for any other hop of g≠n/2−1, and g≠1, there will be a hop of (g) starting at the node before the destination node of the hop of g, a hop of (n/2) from node j is allocated in the reverse direction only if $\max_j=n/2-1$.

As in the case of the odd number of nodes, if the forward hop $h_j$ is other than a hop of 1, the SourceRvs node is determined as by subtracting 1 from the DestFwd node, steps 301 and 303. If SourceRvs≦0, then n is added to SourceRvs. This is done for every subsequent subtraction in the reverse direction allocation.

When n/2 is odd, it is necessary to verify if $\max_j=n/2$ before allocating a hop of (n/2), in order to prevent allocating hops of n/2 and (n/2); which would then reach the same destination node. This results from the fact that $N_f$ is not an integer. This is shown in step 305. An alternative is not to verify the condition and let the second allocation overwrite the first one.

If condition 305 is false, then for a forward direction previous hop h0 of 1, the DestRvs node is determined by subtracting 1 from the SourceRvs node, step 309. The allocation table is completed with the respective source and destination nodes, step 311, and the DestRvs node becomes the SourceRvs for the next hop, step 313. The next destination node is one node before the forward direction previous source node, (hop of 1) and thus j–2, where j is the current forward direction source node, step 315.

On the other hand, for a previous hop h0 different from 1, the DestRvs node is one node before the forward direction source node, or j–1, step 317.

TABLE 10

Reverse direction hop allocation based on the forward allocation for even number of nodes

| Direction | Node | | | | | |
|---|---|---|---|---|---|---|
| | j − 1 | j | j + 1 | ... | n/2 + j − 2 | n/2 + j | n/2 + j |
| forward | | 1 | n/2 − 1 | | | | x |
| reverse | (x) | | | | (n/2-1) | (1) | |

| | Node | | | | | |
|---|---|---|---|---|---|---|
| | j − 1 | j | j + 1 | ... | j + g − 1 | j + g |
| forward | | g ≈ n/2 − 1 | | | | x |
| reverse | (x) | | | | (g) | |

These conditions ensure that:

i) each wavelength is used on every fiber segment (i.e., the add/drop node list forms a loop for each wavelength as described above), except one wavelength that is not used in the reverse direction when n/2 is odd; and ii) each hop $h_j$, $1 \leq h_j \leq \max_j$, is used once from each node in the forward direction, and each hop $h_j$, $1 \leq h_j \leq n-1-\max_j$, is used once from each node in the reverse direction.

Tables 11 and 12 are the hop and source destination tables resulted using this method for rings with eight nodes (n=8).

TABLE 11

Hop table used to obtain wavelength allocation for n = 8

| | Added/dropped at node | | | | | | | |
|---|---|---|---|---|---|---|---|---|
| Wavelength | 1 | 2 | 3 | 4 | 5 | 6 | 7 | 8 |
| $\lambda_0$ | 1 | 3 | (3) | (1) | 1 | 3 | (3) | (1) |
| $\lambda_1$ | 2 | (2) | 2 | (2) | 2 | (2) | 2 | (2) |
| $\lambda_2$ | 3 | (3) | (1) | 1 | 3 | (3) | (1) | 1 |
| $\lambda_3$ | 4 | X | X | (4) | 4 | X | X | (4) |
| $\lambda_4$ | (1) | 1 | 3 | (3) | (1) | 1 | 3 | (3) |
| $\lambda_5$ | (2) | 2 | (2) | 2 | (2) | 2 | (2) | 2 |
| $\lambda_6$ | X | (4) | 4 | X | X | (4) | 4 | X |
| $\lambda_7$ | (3) | (1) | 1 | 3 | (3) | (1) | 1 | 3 |

In this table, "1" and "(1)" represent a hop in the respective forward and reverse directions, while X represents no connection.

TABLE 12

Source-destination table for the wavelength allocation with n = 8

| Source node | Destination node | | | | | | | |
|---|---|---|---|---|---|---|---|---|
| | 1 | 2 | 3 | 4 | 5 | 6 | 7 | 8 |
| 1 | X | 0 | 1 | 2 | 3 | (7) | (5) | (4) |
| 2 | (7) | X | 4 | 5 | 0 | (6) | (2) | (1) |
| 3 | (5) | (2) | X | 7 | 1 | 4 | 6 | (0) |
| 4 | (4) | (1) | (0) | X | 2 | 5 | 7 | (3) |
| 5 | 3 | (7) | (5) | (4) | X | 0 | 1 | 2 |
| 6 | 0 | (6) | (2) | (1) | (7) | X | 4 | 5 |
| 7 | 1 | 4 | 6 | (0) | (5) | (2) | X | 7 |
| 8 | 2 | 5 | 7 | (3) | (4) | (1) | (0) | X |

In this table, "1" and "(1)" represent a wavelengths travelling in the respective forward and reverse directions, and X represents no connection.

Tables 13 and 14 show the hop and source destination tables resulted using this method for rings with ten nodes (n=10). Note that for n=10, n/2=5 is odd, and for wavelength $\lambda_4$, hops of 5 are not allocated in the reverse direction, since these hops would start at nodes 5 and 10, and $\max_5 = \max_{10} = 5$.

TABLE 13

Hop table used to obtain wavelength allocation for n = 10

| | Added/dropped at node | | | | | | | | | |
|---|---|---|---|---|---|---|---|---|---|---|
| Wavelength | 1 | 2 | 3 | 4 | 5 | 6 | 7 | 8 | 9 | 10 |
| $\lambda_0$ | 1 | 4 | X | (4) | (1) | 1 | 4 | X | (4) | (1) |
| $\lambda_1$ | 2 | (2) | 3 | X | (3) | 2 | (2) | 3 | X | (3) |
| $\lambda_2$ | 3 | X | (3) | 2 | (2) | 3 | X | (3) | 2 | (2) |
| $\lambda_3$ | 4 | X | (4) | (1) | 1 | 4 | X | (4) | (1) | 1 |
| $\lambda_4$ | 5 | X | X | X | X | 5 | X | X | X | X |
| $\lambda_5$ | (1) | 1 | 4 | X | (4) | (1) | 1 | 4 | X | (4) |
| $\lambda_6$ | (3) | 2 | (2) | 3 | X | (3) | 2 | (2) | 3 | X |
| $\lambda_7$ | (2) | 3 | X | (3) | 2 | (2) | 3 | X | (3) | 2 |
| $\lambda_8$ | X | (5) | 5 | X | X | X | (5) | 5 | X | X |
| $\lambda_9$ | (4) | (1) | 1 | 4 | X | (4) | (1) | 1 | 4 | X |
| $\lambda_{10}$ | X | (3) | 2 | (2) | 3 | X | (3) | 2 | (2) | 3 |
| $\lambda_{11}$ | X | (4) | (1) | 1 | 4 | X | (4) | (1) | 1 | 4 |
| $\lambda_{12}$ | X | X | X | (5) | 5 | X | X | X | (5) | 5 |

In this table, "1" and "(1)" represent a hop travelling in the respective forward and reverse directions.

TABLE 14

Source-destination table for the wavelength allocation with n = 10

| Source node | Destination Node | | | | | | | | | |
|---|---|---|---|---|---|---|---|---|---|---|
| | 1 | 2 | 3 | 4 | 5 | 6 | 7 | 8 | 9 | 10 |
| 1 | X | 0 | 1 | 2 | 3 | 4 | (9) | (6) | (7) | (5) |
| 2 | (9) | X | 5 | 6 | 7 | 0 | (8) | (11) | (10) | (1) |
| 3 | (6) | (11) | X | 9 | 10 | 1 | 5 | 8 | (3) | (2) |
| 4 | (7) | (10) | (3) | X | 11 | 2 | 6 | 9 | (12) | (0) |
| 5 | (5) | (1) | (2) | (0) | X | 3 | 7 | 10 | 11 | 12 |
| 6 | 4 | (9) | (6) | (7) | (5) | X | 0 | 1 | 2 | 3 |
| 7 | 0 | (8) | (11) | (10) | (1) | (9) | X | 5 | 6 | 7 |
| 8 | 1 | 5 | 8 | (3) | (2) | (6) | (11) | X | 9 | 10 |
| 9 | 2 | 6 | 9 | (12) | (0) | (7) | (10) | (3) | X | 11 |
| 10 | 3 | 7 | 10 | 11 | 12 | (5) | (1) | (2) | (0) | X |

In this Table, "1" and "(1)" represent a wavelengths travelling in the respective forward and reverse directions.

Wavelength Allocation for $n \leq 6$

The method given above is valid when the number of wavelengths per fiber is the limiting constraint ($N = N_f \leq N_a$). For $n \leq 6$, the number of add/drop wavelengths per node is limiting, and these cases are discussed next.

For n=3, $N_a=2$, $N_f=1$ and N=2. Two wavelengths are used, one for each direction connecting each node with the other. For n=4, $N_a=3$, $N_f=2$ and N=3. Therefore, the solutions for n=3 and n=4 are rather simple. Tables 15 and 16 show an example of such allocations.

TABLE 15

Source-destination table for the wavelength allocation with n = 3 nodes

| Source node | Destination Node | | |
|---|---|---|---|
| | 1 | 2 | 3 |
| 1 | X | 0 | (1) |
| 2 | (1) | X | 0 |
| 3 | 0 | (1) | X |

TABLE 16

Source-destination table for the wavelength allocation with n = 4 nodes

| Source node | Destination Node | | | |
|---|---|---|---|---|
| | 1 | 2 | 3 | 4 |
| 1 | X | 0 | 1 | (2) |
| 2 | (2) | X | 0 | (1) |
| 3 | 1 | (2) | X | 0 |
| 4 | 0 | (1) | (2) | X |

For n=5, $N_f=3$ and $N_a=4$, and thus $N \geq 4$ wavelengths. However, for N=4, the shortest path between every node pair creates collisions (the same wavelength is used twice on a fiber or added/dropped twice at a node). It can be shown that it is impossible to add and drop a wavelength at every node using the minimum path for n=5. However, such proof is not pertinent to the invention and is therefore not included.

A hop table, Table 17, shows that the minimum number of wavelengths for a ring with five nodes is 4, if the minimum path is not always chosen. There are also hops of 4. The sum of the additional hops is 4×(3−2)+2×(4−1)=10. This allocation leads to the source-destination table given in Table 19.

TABLE 17

Hop table for the wavelength allocation with n = 5 nodes

| Wavelength | Added/dropped at node | | | | |
|---|---|---|---|---|---|
| | 1 | 2 | 3 | 4 | 5 |
| $\lambda_0$ | 1 | 2 | (3) | 2 | (2) |
| $\lambda_1$ | (3) | (1) | (1) | 1 | 4 |
| $\lambda_2$ | (2) | 3 | (2) | (1) | 2 |
| $\lambda_3$ | (1) | 1 | 1 | 3 | (4) |

TABLE 18

Source-destination table for the wavelength allocation for n = 5 nodes.

| Source node | Destination Node | | | | |
|---|---|---|---|---|---|
| | 1 | 2 | 3 | 4 | 5 |
| 1 | X | 0 | (1) | (2) | (3) |
| 2 | (1) | X | 3 | 0 | 2 |
| 3 | (2) | (1) | X | 3 | (0) |
| 4 | 0 | 3 | (2) | X | 1 |
| 5 | (3) | 2 | (0) | 1 | X |

For n=6, $N_f=4.5$ and $N_a=5$. Since $N_f<N_a$, every wavelength must be added/dropped at every node, but not every wavelength needs to be used on every fiber. In the solution shown in Table 19, wavelength $\lambda_4$ is used on only half the fibers.

TABLE 19

Hop table for the wavelength allocation with n = 6 nodes

| Wavelength | Added/dropped at node | | | | | |
|---|---|---|---|---|---|---|
| | 1 | 2 | 3 | 4 | 5 | 6 |
| $\lambda_0$ | 1 | 2 | (3) | 3 | (2) | (1) |
| $\lambda_1$ | (2) | (1) | 1 | 2 | (3) | 3 |
| $\lambda_2$ | (3) | 3 | (2) | (1) | 1 | 2 |
| $\lambda_3$ | 2 | (2) | 2 | (2) | 2 | (2) |
| $\lambda_4$ | (1) | 1 | (1) | 1 | (1) | 1 |

TABLE 20

Source-destination table for the wavelength allocation for n = 6 nodes

| Source node | Destination Node | | | | | |
|---|---|---|---|---|---|---|
| | 1 | 2 | 3 | 4 | 5 | 6 |
| 1 | X | 0 | 3 | (2) | (1) | (4) |
| 2 | (1) | X | 4 | 0 | 2 | (3) |
| 3 | (2) | (4) | X | 1 | 3 | (0) |
| 4 | 0 | (3) | (2) | X | 4 | 1 |
| 5 | 3 | (1) | (0) | (4) | X | 2 |
| 6 | 4 | 2 | 1 | (3) | (0) | X |

Alternate Wavelength Allocation for odd $n \geq 7$

The wavelength allocations provided in the previous sections are not unique. Other solutions, which are not only a permutation of the proposed solution, also meet the optimality criteria (minimum number of wavelengths).

For example. another solution for odd n≧7, can be obtained by initializing the hop vector to $\vec{h}$=(1, max, max−1, ..., 2, 1, 1, max−1, ..., 1) or $$\vec{h} = \{h_j\} \text{ where } h_j = \begin{cases} 1 & \text{if } j = 1, \\ \max + 2 - j & \text{if } 2 \leq j \leq \max + 1 \\ 1 & \text{if } j = \max + 2 \\ n + 1 - j & \text{if } \max + 3 \leq j \leq n \end{cases} \quad \text{Eq10}$$

The following steps are the same as for the previous solution. For n=7, this leads to the solutions given in Table 21 and Table 22.

TABLE 21

Hop table for the wavelength allocation with n = 7

| Wavelength | Added/dropped at Node | | | | | | |
|---|---|---|---|---|---|---|---|
| | 1 | 2 | 3 | 4 | 5 | 6 | 7 |
| $\lambda_0$ | 1 | 3 | (3) | (1) | 1 | 2 | (3) |
| $\lambda_1$ | 2 | (3) | 2 | (2) | 2 | (2) | 1 |
| $\lambda_2$ | 3 | (2) | (1) | 1 | 3 | (3) | (1) |
| $\lambda_3$ | (1) | 1 | 3 | (3) | (1) | 3 | (2) |
| $\lambda_4$ | (3) | 2 | (2) | 2 | (2) | 1 | 2 |
| $\lambda_5$ | (2) | (1) | 1 | 3 | (3) | (1) | 3 |

TABLE 22

Source-destination table for the alternate wavelength allocation with n = 7 nodes

| Source node | Destination node | | | | | | |
|---|---|---|---|---|---|---|---|
| | 1 | 2 | 3 | 4 | 5 | 6 | 7 |
| 1 | X | 0 | 1 | 2 | (4) | (5) | (3) |
| 2 | (5) | X | 3 | 4 | 0 | (1) | (2) |
| 3 | (4) | (2) | X | 5 | 1 | 3 | (0) |
| 4 | (3) | (1) | (0) | X | 2 | 4 | 5 |
| 5 | 2 | (5) | (4) | (3) | X | 0 | 1 |
| 6 | 0 | 3 | (2) | (1) | (5) | X | 4 |
| 7 | 1 | 4 | 5 | (0) | (3) | (2) | X |

While the invention has been described with reference to particular example embodiments, further modifications and improvements, which will occur to those skilled in the art, may be made within the purview of the appended claims, without departing from the scope of the invention in its broader aspect.

I claim:

1. In a D/WDM ring with n add/drop nodes connected over a forward and a reverse fiber, a method of allocating a wavelength between each pair of nodes for obtaining a fully meshed network, comprising:

determining an add/drop requirement $N_a$ for all nodes of said ring, a fiber requirement $N_f$ for each span of said ring and the minimum number N of wavelengths/span;

preparing a hop table with all nodes $n_j$ and all wavelengths $\lambda_i$ for said ring and selecting an origin for said hop table by defining a node of origin and a first wavelength;

if $N_a \leq N_f$, generating an initial hop vector comprising a set of n initial forward hop values, and determining an initial hop sequence from said initial node, using a subset of said initial hop values;

generating all hops for all nodes and all wavelengths using said initial hop values and recording all said hop values in said hop table; and equipping each node with wavelength-specific receivers and transmitters according to a source-destination table prepared from said hop table.

2. A method as claimed in claim 1, wherein the wavelengths requirement is $N_f$.

3. A method as claimed in claim 2, wherein said step of generating all hops comprises, for each wavelength $\lambda_i$:

determining a current initial node for allocation of a current wavelength $\lambda_i$ based on said node of origin and said first wavelength;

generating a current forward hop sequence and a current reverse hop sequence; and updating said current forward hop values to obtain a subsequent forward hop vector, where i is the range for a wavelength, and is an integer taking values between 0 and $N_f$−1.

4. A method as claimed in claim 3, wherein said step of updating comprises:

incrementing by one said current forward hop value for a node j, if said node j is the destination of a hop for said current forward hop sequence;

maintaining said current forward hop value for said node j, if s aid node j is not the destination of said current forward hop sequence.

5. A method as claimed in claim 4, wherein said step of determining a current initial node comprises:

maintaining said initial node as the initial node for the current forward hop sequence if the current hop value for said node is different from the initial hop value of said initial node; and selecting as said initial node a node j+1 if said current forward hop value for said node equals the initial hop value of said node j.

6. A method as claimed in claim 5, wherein for an odd n>7, said fiber requirement $N_f$ is $(n^2-1)/8$.

7. A method as claimed in claim 6, wherein said step of determining said initial hop vector comprises calculating a set of initial hop values:

$$\vec{h} = (1, \max, \max-1, \ldots, 2, 1, \max, \max-1, \ldots, 2, 1)$$

where max is maximum hop for said ring and is given by (n−1)/2.

8. A method as claimed in claim 7, wherein said step of generating a current reverse hop sequence comprises:

for a forward hop succession of 1, max, recording in said hop table a reverse hop succession of 1, max starting at a node immediately before the destination node for said forward hop of max;

for a FW succession of 1, max−1, recording in said hop table a reverse hop of max, starting at a node immediately before the destination node for said forward hop of max−1;

for a FW hop succession of a hop other than 1, followed by a hop of max, recording in said hop table a reverse hop succession of 1, max−1 starting at a node immediately before the destination node for said hop of max, and for any other forward hop of g, recording in said hop table a reverse hop of g, starting at a node immediately before the destination node for said forward hop of g.

9. A method as claimed in claim 5, wherein for an even n≧8 said fiber requirement $N_f$ is $n^2/8$.

10. A method as claimed in claim 9, wherein said step of determining an initial hop vector comprises:

$$\vec{h} = (1, n/2-1, \ldots, 2, 1, 1, n/2-1, \ldots, 2, 1).$$

11. A method as claimed in claim 10, wherein a maximum hop for said ring max assumes different values according to the range j of a node in said ring and is:

$$\max_j = \begin{cases} n/2 & \text{if } \left(1 \le j \le \frac{n}{2}\right) \text{ and } (j \text{ is odd}) \\ n/2 - 1 & \text{if } \left(1 \le j \le \frac{n}{2}\right) \text{ and } (j \text{ is even}) \\ n/2 & \text{if } \left(\frac{n}{2} + 1 \le j \le n\right) \text{ and } \left(j - \frac{n}{2} \text{ is odd}\right) \\ n/2 - 1 & \text{if } \left(\frac{n}{2} + 1 \le j \le n\right) \text{ and } \left(j - \frac{n}{2} \text{ is even}\right) \end{cases}$$

12. A method as claimed in claim 11, wherein said step of generating a current reverse hop vector comprises:

for a hop forward succession 1, n/2−1, recording in said hop table a reverse hop succession of (1), (n/2−1) starting at a node immediately preceding the destination node of the hop of max;

for any other hop of g≠n/2−1 and g≠1, recording in said hop table a hop of (g) starting at the node immediately before the destination node of the hop of g; and recording in said hop table a hop of (n/2) from said node j only if $\max_j = n/2-1$.

13. A method as claimed in claim 6, wherein said step of determining said initial hop vector comprises calculating a set of initial hop values:

$$\vec{h} = (1, \max, \max-1, \ldots, 2, 1, 1, \max-1, \ldots, 1)$$

where max is maximum hop for said ring and is given by (n−1)/2.

* * * * *